United States Patent [19]
Beck et al.

[11] 3,903,960
[45] Sept. 9, 1975

[54] FAN SHROUD ENTRANCE STRUCTURE

[75] Inventors: Harold D. Beck, Downers Grove; Walter H. Page, Elmhurst, both of Ill.

[73] Assignee: International Harvester Company, Chicago, Ill.

[22] Filed: Dec. 26, 1973

[21] Appl. No.: 428,547

[52] U.S. Cl. ............... 165/51; 123/41.49; 165/122; 180/54 A; 415/219 R; 415/DIG. 1
[51] Int. Cl.² .................................... F01P 11/10
[58] Field of Search ............... 165/134, 51, 122; 123/41.48, 41.49; 180/54 A, 68 R; 415/210, 219 R, DIG. 1

[56] References Cited
UNITED STATES PATENTS

| | | | |
|---|---|---|---|
| 1,519,812 | 12/1924 | Schneider | 123/41.49 X |
| 1,884,094 | 10/1932 | Modine | 165/134 X |
| 1,920,883 | 8/1933 | Perkins | 123/41.49 |
| 2,252,256 | 8/1941 | Harris | 181/48 |
| 2,728,411 | 12/1955 | Pasturczak | 123/41.49 |
| 3,144,859 | 8/1964 | Walton | 123/41.49 |

*Primary Examiner*—Albert W. Davis, Jr.
*Assistant Examiner*—Sheldon Richter
*Attorney, Agent, or Firm*—Frederick J. Krubel; Floyd B. Harman

[57] ABSTRACT

A heat exchanger system for a liquid-cooled internal combustion engine including a heat exchanger, a blower-type fan for moving air through the heat exchanger, and noise-suppressing shroud structure for directing the fan induced air stream axially through the heat exchanger. The fan shroud structure, which encircles the blower-type fan, is formed to provide a generally cylindrical discharge throat section (CF), a radial converging section (R) serving as a transition between the throat section and a radial entrance section (RF) and wherein the fan has a projected axial width (AW). The various shroud structure sections are dimensioned with respect to such projected axial width (AW) of the fan in the following manner: $CF = AW/3$, $RF = AW/3$, and $R = 2AW/3$.

5 Claims, 4 Drawing Figures

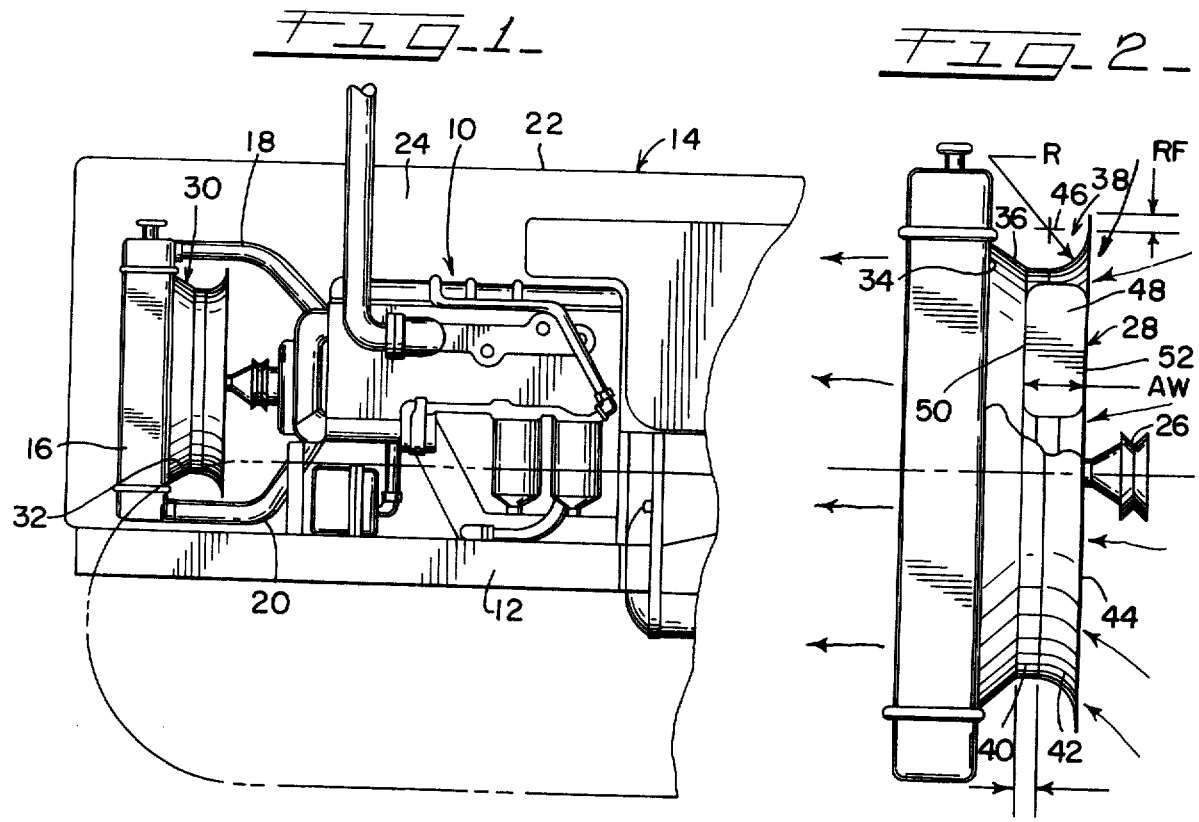
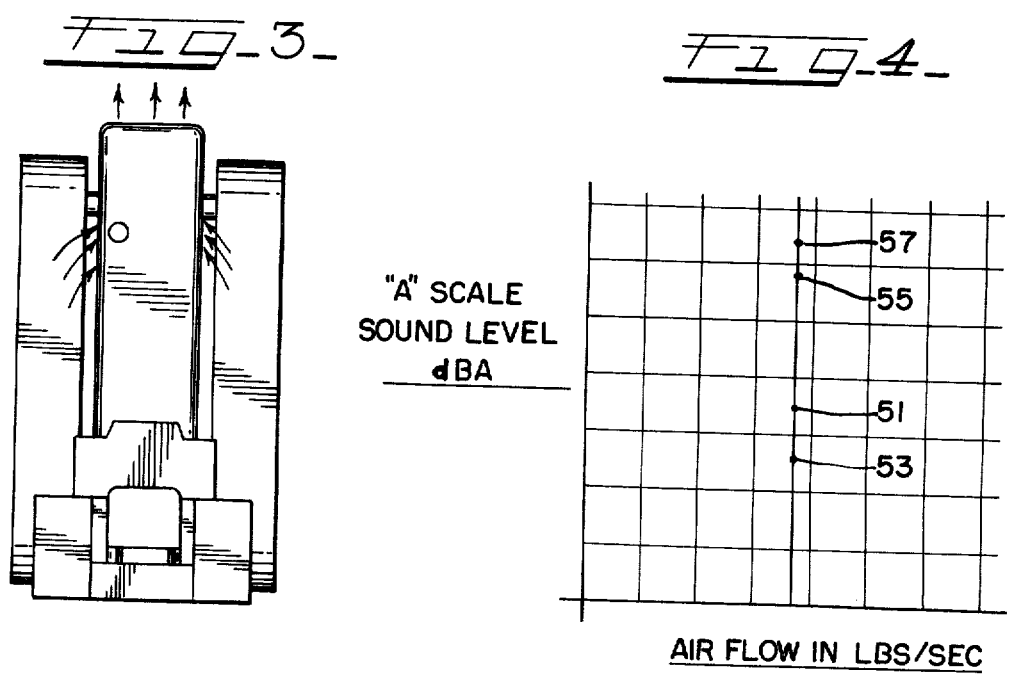

FAN SHROUD ENTRANCE STRUCTURE

This invention relates to a new and improved fan shroud entrance structure for use in combination with a heat exchanger and a blower-type fan which is effective to substantially reduce the noise level generated by the fan when in operation without adversely effecting the efficiency thereof. The present application is related to copending application Ser. No. 348,436 filed Apr. 5, 1973 in the name of Harold D. Beck, and assigned to the assignee of the present invention, now U.S. Pat. No. 3,872,916.

Most vehicles in general use today are propelled by internal combustion engines and such engines, as is well known, generate heat during operation of the same. For the most part, the motor vehicle internal combustion engines employed commercially are of the liquid cooled type which entails the circulation of a coolant through the engine for absorbing heat. The correct operating temperature of the engine is maintained by subsequently passing the heated coolant received from the engine through a heat exchanger system for dissipating heat from the coolant to the atmosphere and returning the coolant to the engine for recirculation in the engine. Generally, the heat exchange system employed includes a heat exchange or radiator through which the heated coolant received from the engine is caused to flow. Simultaneously, air is also caused to flow through the radiator which absorbs the heat from the heated coolant and carries it out into the atmosphere.

The cooling capacity of a heat exchange system of the type to which the present invention relates is dependent upon many factors including the velocity and volume of the air caused to flow through the radiator. Different types of fan systems are used to achieve the necessary air flow through the radiator in order to maintain the desired operating temperature of the engine. That is, some fan assemblies are designed to suck or draw air from the atmosphere through the radiator and discharge the same back over the engine and thereafter exiting the heat-ladened air to the atmosphere. This type of fan is known as an axial flow suction fan, i.e. it draws or sucks air axially through the radiator. Another type of fan works in a reversed manner, that is, it draws air from the engine compartment wherefrom it is blown forwardly through the radiator to achieve the necessary air flow through the radiator. A blower type fan is often employed when the vehicle in which it is installed is performing tasks that generate large amounts of dust or air borne particles and it is desirous to keep such material from settling in the engine compartment. Blower type fans are also employed where thermal and/or air pollution caused by the cooling fan generated air stream would be detrimental to the operator environment which is generally aft of the vehicle engine and heat exchanger. This dust problem is found in many cases to have a detrimental effect upon the engine and its performance while heat and noise reduce the efficiency of the operator. On the other hand, those vehicle heat exchange systems wherein air is blown forwardly through the radiator also possess serious shortcomings. The fact that the air is often pre-heated substantially by the passage around the hot engine before passing through the radiator and, further, the fact that the vehicle is generally moving forwardly whereby the ram effect air stream created by the moving vehicle which obviously is in a direction reverse to the blower fan generated air stream oftentimes necessitates additional fan power to achieve and maintain a desired engine operating temperature.

It is, however, necessary under certain working conditions that a blower type fan be employed regardless of its inherent disadvantages as noted above. An example would be a crawler type dozer vehicle working on a job where fine, loose, crystaline material, such as sand was prevalent. Under these conditions just passage of the airborne material through the radiator or cooling means would have an effect thereon similar to sand blasting. As is apparent the structural material from which the radiator is fabricated would be eroded. Thus, heretofore, the vehicle had to be outfitted with a blower fan even though increased fuel consumption and noise pollution resulted from such choice to maintain the proper cooling air flow.

It is thus apparent that the blower system possess characteristics which are far from those which are desirable but necessary in particular circumstances. It is therefore an object of this invention to provide a heat exchanger system for a motor vehicle engine wherein a blower type fan is employed which draws air from the engine compartment and surrounding area and expells the air in the form of a stream forwardly through the heat exchanger means and wherein new and improved fan shroud means are used which are effective for substantially mitigating the shortcomings inherent in prior art heat exchange systems utilizing blower-type fans. Another object of this invention is to provide an air entrance section for a blower fan shroud which is effective to substantially reduce the level of the noise generated by the fan. Still another object of this invention is to provide a shroud entrance section contoured or shaped in a unique manner with reference to the axial fan width in the vicinity of the blower fan blade tip whereby a beneficial effect on the shedding of the fan tip vortex is achieved which fan tip vortex is often cited as the major source of fan generated noise.

In accordance with the preferred embodiment of this invention a vehicle is provided having a liquid cooled internal combustion engine and a radiator cooling system for dissipating the heat produced. The radiator cooling system includes a radiator, a blower type, axial flow fan at one side of and facing the radiator and having a plurality of angular blades whereby air is blown forwardly through the radiator. A shroud extends rearwardly from the backside or air entrance face of the radiator to channel air through the radiator. For the most part the shroud encircles the entire perforated heat exchanging rear face of the radiator. The fan shroud includes a contoured entrance section. As will be later explained it is the particular contour of this entrance section in combination with a blower axial flow fan located therein, the location thereof also being important, which allows the air stream to be both axially and radially converged from the engine compartment and blown forwardly through the radiator with a reduction in fan generated noise. As is apparent this invention is also applicable to a stationary engine where it is desired to direct the air stream.

Other objects and advantages of the invention will become apparent upon reading the following detailed description and upon reference to the drawings, in which:

FIG. 1 is a side elevation of an internal combustion engine showing the device of applicants' invention attached to a vehicle;

FIG. 2 is a fragmentary vertical section showing the relationship of the fan to the contoured entrance section and the direction of air flow;

FIG. 3 is a top view of a tractor showing the directed air stream achieved with the radiator cooling assembly herein disclosed; and FIG. 4 is a graphic representation of the relationship between the prior art fan shroud blower/suction fan assemblies and the fan shroud blower assembly herein disclosed.

While the invention will be described in connection with a preferred embodiment, it will be understood that it is not intended to limit the invention to that embodiment. On the contrary, it is intended to cover all alternatives, modifications and equivalents as may be included within the spirit and scope of this invention as defined by the appended claims.

Turning first to FIG. 1 there is shown a conventional liquid-cooled heat producing internal cumbustion engine 10 carried on longitudinally extending support means 12 of a vehicle 14, partially shown in FIG. 1. As shown herein the vehicle 14 is a crawler tractor. However, as will hereafter become more apparent the heat exchanger apparatus of the present invention can be applied to any type of vehicle employing any type of heat generating engine, whether of the internal or external combustion type or to any other heat exchanger system, whether portable or stationary, and whether used in conjunction with an engine or not. Mounted forwardly of the engine 10 is a water cooling radiator 16 employed to dissipate the engine generated heat. Water or engine coolant flows between the water jacket (not shown) on the engine 10 and the radiator 16 through a pair of fluid communicating means or hoses 18 and 20. In this particular embodiment sheet metal structure 22, partially shown in FIG. 1, substantially encloses the engine 10 thereby partially defining the engine compartment space 24.

Projecting forwardly at the forward end of engine 10 is an engine-driven fan shaft 26, as shown in FIG. 2, whereby power is delivered to drive a fan blower-type 28. It is to be understood, the particular mode whereby power is transmitted between the engine 10 and the fan 28 thereto is not critical as far as the invention is concerned. Thus, in lieu of the direct drive transmission illustrated conventional belt and pulley combinations could be employed. As employed here, the air-stream producing means is a rotatable blower-type, multibladed fan which is axially positioned intermediate the radiator 16 and the engine 10. The fan 28 normally during operation of the engine 10, generates a flow of air which is directed by shroud means, designated generally by reference numeral, 30 axially forwardly through the radiator 16. The particular configuration of the forward discharge section 32 of the shroud means 30 is dependent upon the configuration and design of the radiator 16. The nature of the connection between the discharge or forwardmost edge of the discharge shroud section 32 and the rearwardmost or air entrance face 34 of the radiator 16 will be dependent upon the particular characteristics of these components, that is, some connections being provided with air gaps while others are substantially sealed over the entire periphery of the mating structures. In the preferred form of this invention the entire rear face of the radiator 16 is substantially sealed against the passage of air at the joint between the radiator 16 and the shroud 30. From the forwardmost discharge edge or edges of discharge the shroud section 32, (be it a taper transition as shown or a box type) the discharge shroud section 32 is formed so that it converges axially and rearwardly whereby its rearwardmost edge 36 is substantially defined by a circle.

Referring now to FIG. 2, an entrance shroud means 38 as shown extending axially rearwardly and radially outwardly from the rearwardmost edge 36 of the discharge shroud section 32. The connection or joint between the discharge shroud section 32 and the entrance shroud means 38 can be achieved by any suitable means. However, it is desirable that such connection or joint be relatively free of gaps or spaces which would allow the passage of air. Entrance shroud means 38 includes a generally cylindrical section 40, an arcuate or curved portion 42 and a radially extending flat flange portion 44. For the most part cylindrical section 40, where it joins the rearwardmost edge 36 of the discharge shroud section 32, defines the discharge edge of the entrance shroud means 38.

The arcuate or curved portion 42 extends radially outwardly and axially rearwardly from the opposite or rearwardmost edge of the cylindrical section 40. The arcuate or curved portion 42 has a radius of curvature R which extends from an infinite number of reference points 46, all of which lie in a plane containing the rearwardmost edge of the cylindrical shroud section 40. The reference points 46 also lie in a circle having a diameter equal to the diameter of the cylindrical shroud section 40 plus two times the radius of curvature R. That is, arcuate portion 42 has a general bell-shaped appearance being a section of a transition surface or some approximation thereof. In the preferred embodiment arcuate section or portion 42 has a constant radius of curvature R. Flat flange portion or section 44 forms the leading entrance edge of entrance shroud means 38 and generally lies in a radial plane perpendicular to that of cylindrical section 40. Overall the entire fan entrance shroud means 38 has a hornlike configuration.

As previously stated, blower fan 28 is rotatingly carried adjacent one side of said radiator 16 and is operable to establish a flow of cooling air therethrough. Fan 28 includes a plurality of radially extending fan blades 48 (only one of which is shown) as is well known in the art. As shown in FIG. 2 fan 28 is surrounded or encircled by said contoured fan entrance shroud section 38. The enclosure or encirclement of the fan 28 within shroud section 38 is such that a forward plane struck out by the trailing edges 59 of the fan blades 48 is coextensive and passes through the discharge or forwardmost edge of the cylindrical section 40 and a rear plane struck out by leading edges 52 of the fan blades 40 lies substantially in the plane of said radial flat flange portion 44. It should be noted, however, that there is a plus or minus error factor involved in both of these values of about 12 percent of AW or the projected width of the fan blades 48 measured in an axial direction. That is, the respective planes formed by the blades 48 can be positioned within about 12 percent of the optimum positioning described above with reference to the leading and trailing edges of the fan blades 48 with respect to the axial length of the cylindrical shroud section 40 and the axial position of the radial flat portion 40 and still function satisfactorily within the scope of this invention. Thus, within this range a beneficial effect is still achieved on the shedding of the fan tip vortex which, in turn, results in a substantial lowering of fan generated noise.

It has been determined, however, that best results are obtained when the so called front plane struck out by trailing edges 50 of the fan blades 48 passes through the juncture point between shroud section 36 and the cylindrical section 40. Even more determinative on the result is the relationship between the so called rear plane struck out by leading edges 52 of the fan blades 40 and the radial flat shroud portion 44. Overall performance is achieved when the rear plane and the radial flat shroud portion 44 lie in the same plane.

The following relationship exists between these parameters: $RF = AW/3$, $CF = AW/3$, and $R = 2\ AW/3$ where $RF$ is the radial length of the radial flat shroud portion or section 44, $CF$ is the axial length of the cylindrical shroud section 40 and $R$ is the radius of curvature of the arcuate or curved section 42. $R$ is also the distance from the reference points 46 to the transition surface and $AW$ is the projected axial width of fan blades 48.

Considering now FIG. 4 wherein is shown how sound generation varies with shroud design and type of fan. It should be understood that all variables such as engine, fuel, vehicle, type, engine components, component location, etc. are kept constant. Only the type of fan, the shroud design and the revolutions per minute (rpm's) of the fan were varied and this latter factor (rpm's) was varied only to maintain a constant air flow through the radiator. It should be pointed out that FIG. 4 is only a representation of an actual relationship. Thus, actual values have not been assigned in decibels or air flow coordinates. The following relationship as represented by test numbers 51, 53, 55 and 57 exists: Number 51 represents a conventional suction fan and shroud operating "X + Y" rpm's; Number 53 represents a conventional suction fan and the shroud herein described at "X" rpm's; Number 55 represents a conventional blower fan employing the shroud described herein at "T" rpm's; and Number 57 represents a conventional blower fan employing a conventional shroud operating at "T" rpm's.

Considering these designs, it becomes apparent that test 53 represents a fuel saving in lower horsepower (since the fan is operating at a lower speed for a given air flow value) and a noise reduction over test number 51 while maintaining the same air flow. If the rpm's of the test Number 53 were increased to that of test Number 51 so would the air flow, such that "X + Y rpm's" a larger volume of air would be moved. Test Number 55 represents only a noise reduction while the fuel consumption is about the same as that of test Number 57, i.e., rpm's are about the same to move a given quantity of air through the radiator. Applicants are not certain as to why such a deviation exists but only that the employment of a blower fan with the shroud design disclosed herein results in a lowering of the noise generated by the fan.

The relation of the fan 28 to the shroud entrance section means 38 is most conveniently expressed in terms of the amount of each of the fan blades 48 which is projected axially beyond the forwardmost end of the cylindrical shroud section 40 or axially rearwardly of the radial flat shroud section ($X_E$). It has been found that a $X_E$ equal to 0 gives optimum results; however, reasonable results can be achieved by having $X_E$ about equal to plus or minus 12 percent of $AW$. That is, as explained previously when the plane swept out by the fan blade leading edges 52 lies in the plane of the surface of the radial flat shroud section or within the tolerance set forth.

From the foregoing, it will be appreciated that a novel heat exchanger shroud means for use with a blower-type fan has been provided which includes a discharge shroud section and an entrance shroud section. The entrance shroud section, in turn, includes a cylindrical throat section, a radial curved or converging section, and a radial flat section portion. The discharge edge of the cylindrical throat section is secured to the discharge shroud section around its entire periphery. The fan assembly disposed in the entrance shroud section includes a plurality of fan blades having front or trailing edges and leading or rear edges. These edge means sweep out planes as they rotate, that is, front and rear planes. The front plane for the most part should intersect the junction between the discharge shroud section and the cylindrical throat section while the rear plane should lie substantially in the radial plane of the radial flat portion. In the assembly the following relationship plus or minus 12 percent of $AW$ exists: $RF = AW$ divided by 3, $CF = AW$ divided by 3, and $R = 2AW$ divided by 3 where $RF$ is the radial length of the radial flat portion, $CF$ is the axial length of the cylindrical throat section, $R$ is the radius of curvature of the arcuate shroud section or the distance from the reference point to the radial converging or arcuate section and $AW$ is the projected axial width of the fan blades. It should be noted that the 12 percent value means that any of the parameters can be varied such that the result is a 12 percent in $AW$, i.e., $RF$ can be varied such that the $AW$ will be 12 percent of the optimum. As is apparent ± 12 percent can vary from 0 to ± 12 percent, i.e. ± 6 percent, ± 3 percent etc. As has been pointed out previously the R value in the preferred embodiment is the radius of the radial converging section, that is, the radial converging section is a part of a circle. However, as is apparent it may deviate from this preferred form. Accordingly, the blower fan induced stream of air is drawn in radially and axially from the area associated with the engine, directed by the shroud means into the radiator and out in front of the vehicle. Mechanism of the reduction in fan generated noise is unclear, however, it is felt that the presence of the controued entrance shroud section in the vicinity of the fan blade tip beneficially effects the shedding of fan tip vortexs.

Thus it is apparent that there has been provided in accordance with the invention, a shroud and blower fan means that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A heat exchange apparatus comprising:
    a heat exchange means having front and rear faces;

a shroud means having a forward section arranged to encircle said rear face, and a rearwardly extending cylindrical contoured entrance section means including in successive sections a cylindrical throat section, a radial curved section and a radial flat portion;

a blower fan assembly including a plurality of fan blades, each of said fan blades having a leading edge and a trailing edge, said trailing edges lying substantially in a radial plane containing the juncture of said forward section and said contoured entrance section, and said leading edges lying substantially in a radial plane containing said radial flat portion wherein the following relationship exists: $RF = AW/3$, $CF = AW/3$, and $R = 2AW/3$ where $RF$ is the length of the radial flat portion, $CF$ is the length of the cylindrical throat section, $R$ is the radius of curvature of the radial curved section and $AW$ is the projected axial width of the fan blades.

2. A heat exchange apparatus for an internal combustion engine comprising:

a radiator;

a shroud means having a forward portion arranged to encircle one side of said radiator and a rearwardly extending cylindrical contoured section joined to said forward portion including in successive sections a cylindrical throat section; a radial curved section and a radial flat portion;

a blower fan assembly including a plurality of fan blades, each of said fan blades having a trailing edge and a leading edge, said trailing edges generally lying in a radial plane containing the juncture of said forward section and said cylindrical contoured section, and said leading edges generally lying in the radial plane of said radial flat portion wherein the following relationship plus or minus 12 percent exists: $RF = AW/3$, $CF = AW/3$ and $R = 2AW/3$ where $RF$ is the radial length of the radial flat portion, $CF$ is the axial length of the cylindrical throat section, $R$ is the radius of the radial curved section, and $AW$ is the projected axial width of the fan blades.

3. A heat exchange apparatus comprising:

a heat exchange means having front and rear faces; shroud means including a discharge shroud means having forwardmost edge means arranged to encircle said rear face of said heat exchange means, and a rearwardly extending entrance shroud means having forwardmost edge means joined to rearwardmost edge means of said discharge shroud means, said entrance shroud means including in successive sections a generally cylindrical throat section, a radial curved section and a radial flat portion;

a blower fan including a plurality of fan, each of which has a trailing edge and a leading edge, said trailing edges lying generally in a forward radial plane and said leading edges lying generally in a rearward radial plane, said forward radial plane lying substantially in the plane of the juncture between said discharge shroud means and said entrance shroud mains and said rearward radial plane lying substantially in the plane of said radial flat portion wherein the following relationships within plus or minus 12 percent of $AW$ exists: $RF = AW/3$, $CF = AW/3$, and $R = 2AW/3$ where $RF$ is the length of the radial flat portion, $CF$ is the length of the cylindrical throat section, $R$ is the radius of the radial curved section and $AW$ is the projected axial width of the fan blades.

4. The heat exchange apparatus of claim 3 wherein the relationship vary within plus or minus 6 percent of $AW$.

5. The heat exchange apparatus of claim 3 wherein the relationship vary within plus or minus 3 percent of $AW$.

* * * * *